United States Patent
Ewald

(10) Patent No.: US 10,577,232 B2
(45) Date of Patent: Mar. 3, 2020

(54) SEATING SUPPORT FOR AN INDUSTRIAL TRUCK

(71) Applicant: Jungheinrich Aktiengesellschaft, Hamburg (DE)

(72) Inventor: Evan Ewald, Houston, TX (US)

(73) Assignee: Jungheinrich Aktiengesellschaft, Hamburg (DE)

( * ) Notice: Subject to any disclaimer, the term of this patent is extended or adjusted under 35 U.S.C. 154(b) by 24 days.

(21) Appl. No.: 15/907,716

(22) Filed: Feb. 28, 2018

(65) Prior Publication Data
US 2019/0263645 A1   Aug. 29, 2019

(51) Int. Cl.
*B66F 9/075*   (2006.01)
*B60N 2/90*    (2018.01)
*B60N 2/38*    (2006.01)
*B60N 2/16*    (2006.01)

(52) U.S. Cl.
CPC ............ *B66F 9/0759* (2013.01); *B60N 2/16* (2013.01); *B60N 2/38* (2013.01); *B60N 2/986* (2018.02)

(58) Field of Classification Search
CPC .......... B66F 9/0759; B60N 2/16; B60N 2/38; B60N 2/986
See application file for complete search history.

(56) References Cited

FOREIGN PATENT DOCUMENTS

| DE | 102006047403 A1 | 4/2007 | |
|---|---|---|---|
| DE | 102008014643 A1 | 9/2009 | |
| DE | 102014114428 A1 * | 4/2016 | ............ B66F 9/0759 |
| EP | 3018090 B1 | 11/2016 | |
| WO | 99/10271 A1 | 3/1999 | |

* cited by examiner

*Primary Examiner* — D Glenn Dayoan
*Assistant Examiner* — Melissa Ann Bonifazi
(74) *Attorney, Agent, or Firm* — Barclay Damon LLP

(57) ABSTRACT

A seating support for an industrial truck with a standing platform that is bordered on one side by a platform rear wall comprises a first section and a second section. The first section comprises a support body, which further comprises a body rear wall configured to connect to the platform rear wall using one or more coupling elements and a standing surface configured to stand on the standing platform. The second section comprises a support surface for a person standing on the standing platform.

13 Claims, 2 Drawing Sheets

SEATING SUPPORT FOR AN INDUSTRIAL TRUCK

BACKGROUND

The present invention is directed to a seating support for an industrial truck that has a support surface for a person standing on a standing platform of an industrial truck. The seating support may also be termed a seat insert.

An industrial truck has been disclosed in EP 3018090 B1 as having a standing platform which is bordered on one side by a rear wall on which a back element is provided that has a foldable seat unit. When the foldable seat unit is in its folded-up position, it comprises a backrest in the back element and, in its folded-down position, comprises a seat surface in the form of a saddle with a projecting saddle nose.

A driver's platform for an industrial truck that comprises a seat apparatus has been disclosed in WO 99/10271. The seat apparatus possesses three different positions: a first position it is folded downward and away; in a second position it has a seat support for a standing person; and in a third position it has a sitting position for a completely seated person.

A backrest mechanism for an operating platform of an industrial truck has been disclosed in DE 102006047403 A1. The backrest mechanism possesses a height-adjustable frame with a circular cylindrical cushion against which a person traveling on the vehicle can be supported in a substantially sitting position.

A driver workplace for an industrial truck in which a seat support is formed as a leaning aid has been disclosed in DE 102008014643 A1. The leaning aid supports a standing person when the person leans their back against the leaning aid.

The disadvantage of the above-described seating supports is that they are difficult or impossible to retrofit into existing industrial trucks. When one or more industrial trucks are to be equipped with a seating support, it is always necessary to change the structure of the rear wall, which is associated with long setup times and corresponding costs.

BRIEF SUMMARY OF THE INVENTION

The object of the invention is to create a seating support for an industrial truck that also can be easily retrofitted into an existing vehicle.

A seating support for an industrial truck with a standing platform that is bordered on one side by a platform rear wall comprises a first section and a second section. The first section of the seating support comprises a support body. The support body further comprises a body rear wall configured to connect to the platform rear wall using one or more coupling elements and a standing surface configured to stand on the standing platform. The second section of the seating support comprises a support surface for a person standing on the standing platform. A surface opposite the standing surface of the support body abuts or terminates at the second section.

In an embodiment, the seating support for an industrial truck is provided with a standing platform bordered on one side by a platform rear wall. The standing platform forms the standing workplace for an operator of the industrial truck. The seating support has a support surface for a person standing and leaning back on the standing platform. The support surface supports the standing person preferably in the transitional region between the thigh and buttocks. According to an embodiment, the seating support comprises a support body and fastening means. The support body has a standing surface that stands on the standing platform and a surface on the opposite side from the standing surface that abuts the second section of the seating support. The support body is placed as a standing body with its standing surface on the standing platform. The fastening means may comprise one or more coupling elements configured to connect a body rear wall of the support body standing on its support surface to the platform rear wall. The seating support uses the platform rear wall to fasten the support body. Given the concept of the support body that can be placed on the standing platform, the seating support is particularly suitable for being subsequently used permanently or temporarily in existing industrial trucks.

In an embodiment, the support body can be releasably connected to the platform rear wall by the one or more coupling elements. The one or more coupling elements are configured for easy releasability. In this manner, the seating support can also be used in the industrial truck as needed.

In an embodiment, the support body may be a uniform body with a predetermined height between the standing surface and the second section of the seating support. The support body can, for example, have a cuboid shape, such that the standing surface and the second section are spaced from each other by the cuboid length. In an embodiment, the uniform body is hollow to eliminate excess weight and ensure that the support body is also easy to handle when installing it in and removing it from the industrial truck. A plastic material can be provided for the support body.

In an embodiment, the support body comprises a body rear wall that extends between the standing surface and the second section and has a contour that is adapted to the platform rear wall in order to at least partly contact the platform rear wall. The at least partial contact with the platform rear wall lends additional stability to the seating support and precisely dictates the installation position. Preferably with this embodiment, the shape of the body rear wall is adapted to the platform rear wall.

In an embodiment, the support body comprises a body front wall that is the wall opposite the body rear wall. The body front wall comprises at least two portions: a first portion that abuts the standing surface; and a second portion that terminates at the second section of the seating support or at a surface opposite the support surface. In this regard, the first portion has a shallower depth between the body front wall and the body rear wall than the second portion. The second portion that transitions into the support surface and accordingly has a greater depth. The depth is the distance between the front and rear wall. The support body has a small volume on the standing platform due to the shallow depth in the first portion. There is accordingly no need to dimension the standing platform larger in order to additionally introduce a seating support.

In an embodiment, the first portion of the body front wall has a foot section that has a greater depth in the region of the standing surface. The foot section can, for example, have a triangular shape with regard to the depth. In an embodiment, the foot section may be recessed with regard to the standing surface.

In another embodiment, the fastening means of the seating support is a releasable hook-and-loop connection. By means of the hook-and-loop connection, the support body is then releasably fastened to the platform rear wall. Other releasable fastening means such as latching and snap connectors are also possible.

In another embodiment, a set of seating supports is provided that differ from each other in terms of the respective height of the support surfaces. With such a set of seating supports, it is possible for an operator to select a seating support adapted to his body size and insert it into his industrial truck provided for use. This yields a seating support with an adapted height for the operator. In another embodiment, the seating support is height-adjustable. With the height adjustment, any seating support can be adapted to individual requirements by adjusting the height of the support surface. The height-adjustable seating support enables installation during retrofitting in addition to the releasable connection with the platform rear wall.

BRIEF DESCRIPTION OF THE DRAWINGS

The invention will be further explained below using an exemplary embodiment. In the following.

DETAILED DESCRIPTION OF THE INVENTION

Figure 1:
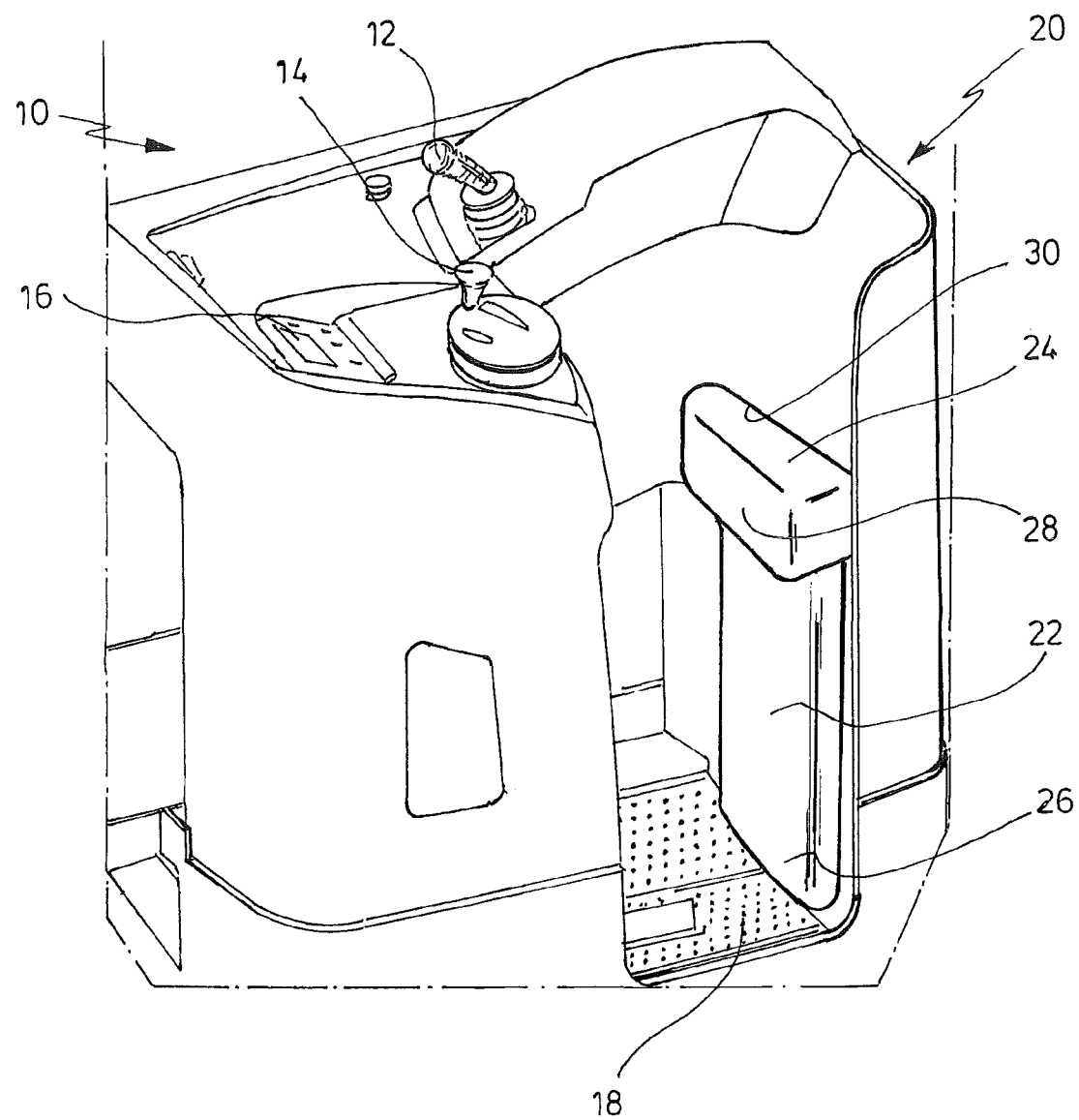
FIG. 1 illustrates a perspective view of a driver's platform with an embodiment of a seating support.

FIG. 1 shows a control platform 10 for an industrial truck. The control platform 10 comprises one or more control elements 12, 14, such as a joystick and/or a steering wheel, and a display 16. The control elements 12 and 14 and the display 16 are configured to be actuated or viewed by a standing operator. The operator stands on a standing platform 18 that, for example, is equipped with a dead man's switch (not shown). The dead man's switch ensures that the industrial truck can only be actuated when a weight is detected on the standing platform 18. If no weight is detected on the standing platform 18 by the dead man's switch, actuation of functions in the industrial truck is blocked.

The control platform 10 comprises a platform rear wall 20 opposite the control element 14 that is a steering wheel and the display 16. The platform rear wall 20 is arranged so that a driver who is oriented in his position to face the control elements 12, 14 and display 16 turns his back to the platform rear wall 20. The platform rear wall 20 does not have to be arranged on a rear side of the vehicle with reference to the main direction of movement of the industrial truck. Instead, the platform rear wall 20 can also be easily positioned transverse to a vehicle longitudinal direction. In an embodiment, the platform rear wall 20 can be a sheet metal wall that borders the region on the standing platform 18 or an assembly equipped with components such as a tank for hydraulic fluid.

The seating support 22 that provides a support surface 24 for a person can be seen in FIG. 1. As shown, the seating support 22 comprises a first section 26 that comprises a support body that has a standing surface on the standing platform 18, and a second section 28 that includes the support surface 24. As shown in FIG. 1, the support body abuts the second section 28 at the end opposite the standing surface.

As shown in FIG. 1, the seating support 22 stands on the standing platform 18 with its standing surface on the bottom side of the first section 26. In this context, depending on the configuration of the dead man's switch, it can be provided that a weight on the seating support 22 also actuates the dead man's switch and thereby releases operation of the vehicle. The second section 28 has a greater depth than the first section 26. The depth is the amount at which the second section 28 is furthest from the platform rear wall 20. Along the line 30 that borders the transition from the support surface 24 to the platform rear wall 20, it can be seen that the contour of the seating support 22 is adapted to the platform rear wall 20 on its side facing the platform rear wall 20.

The seating support 22 may contact the platform rear wall at an interface. The seating support 22 can be releasably connected to the platform rear wall 20 along the interface by the one or more coupling elements (not shown). The one or more coupling elements (not shown) are configured for easy releasability. In an embodiment, the one or more coupling elements (not shown) of the seating support 22 are a releasable hook-and-loop connection. By means of the hook-and-loop connection, the seating support 22 is then releasably fastened to the platform rear wall 20. Other releasable fastening means such as latching and snap connectors are also possible.

The support body comprises a body rear wall that extends between the standing surface and the second section 28 and has a contour that is adapted to the platform rear wall 20 in order to at least partly contact the platform rear wall 20. The at least partial contact with the platform rear 20 wall lends additional stability to the seating support 22 and precisely dictates the installation position. Preferably with this embodiment, the shape of the body rear wall is adapted to the platform rear wall.

In an embodiment, the support body further comprises a body front wall that is the wall opposite the body rear wall. The body front wall comprises at least two portions: a first portion that abuts the standing surface; and a second portion that terminates at the second section 28 of the seating support 22 or at a surface opposite the support surface. In this regard, the first portion has a shallower depth between the body front wall and the body rear wall than the second portion. The second portion that transitions into the support surface and accordingly has a greater depth. The depth is the distance between the body front and the body rear wall. The support body has a small volume on the standing platform 18 due to the shallow depth in the first portion. There is accordingly no need to dimension the standing platform 18 larger in order to additionally introduce a seating support.

In an embodiment, the first portion of the body front wall has a foot section that has a greater depth in the region of the standing surface. The foot section can, for example, have a triangular shape with regard to the depth. In an embodiment, the foot section may be recessed with regard to the standing surface.

Figure 2:
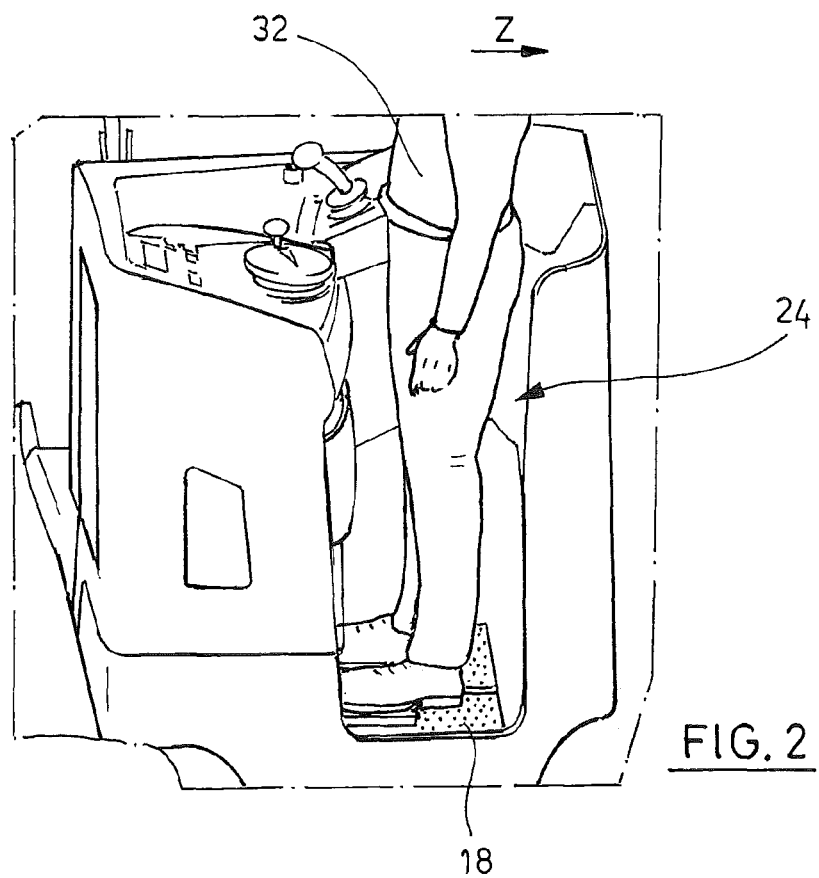
FIG. 2 illustrates the driver's platform from FIG. 1 with an embodiment of a support surface of the seating support.
Figure 3:
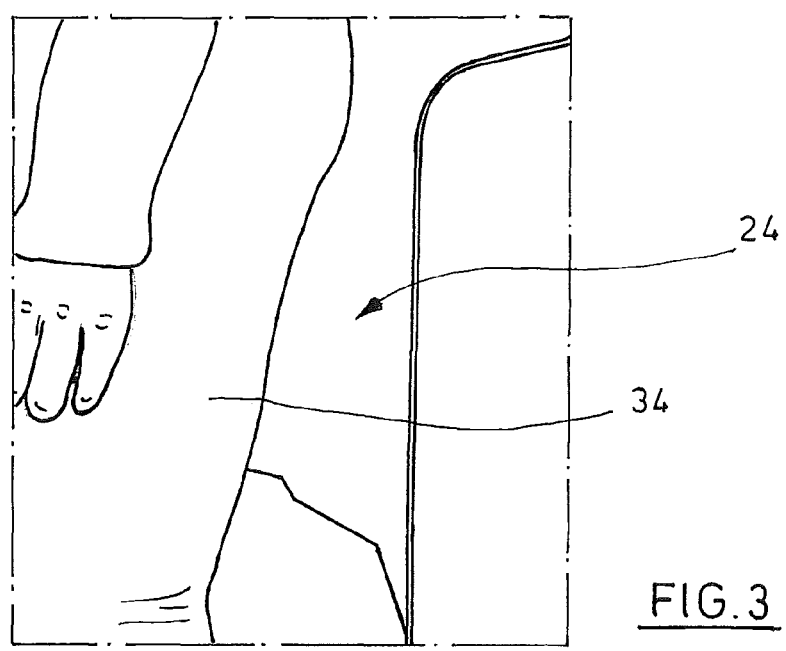
FIG. 3 illustrates an enlarged view of the support surface of FIG. 2.

As shown in FIGS. 2 and 3, an operator 32 is standing on the standing platform 18. The support surface 24 is located at the top part of the thigh 34 so that the operator 32 can support himself against the support surface 24 when leaning back in direction Z, for example while bending at the knee.

REFERENCE NUMBER LIST

10 Control platform
12 Control element/Joystick
14 Control element/Steering wheel
16 Display
18 Standing platform
20 Platform rear wall
22 Seating support
24 Support surface 26 First section
28 Second section
30 Line
32 Operator
34 Thigh, Operator

The invention claimed is:

1. A seating support for an industrial truck with a standing platform that is bordered on one side by a platform rear wall, the seating support comprising:
 a first section comprising a support body, wherein the support body comprises,
  a body rear wall configured to connect to the platform rear wall using one or more coupling elements, and
  a standing surface configured to contact the standing platform; and
 a second section comprising a support surface that is configured for an operator to sit on, wherein a surface opposite the standing surface of the first section abuts a surface of the second section.

2. The seating support according to claim 1, wherein the one or more coupling elements are configured to releasably connect the support body to the platform rear wall.

3. The seating support according to claim 1, wherein the support body is a uniform body with a predetermined height between the standing surface and the second section.

4. The seating support according to claim 3, wherein the uniform body is hollow.

5. The seating support according to claim 1, wherein the body rear wall of the support body extending between the standing surface and the second section is contoured to at least partially contact the platform rear wall.

6. The seating support according to claim 1, wherein a body front wall is positioned opposite the body rear wall and comprises at least two portions.

7. The seating support according to claim 6, wherein a first portion of the body front wall abuts the standing surface of the support body and a second portion of the body front wall terminates at the second section of the seating support, wherein the first portion has a shallower depth between the body front wall and the body rear wall than does the second portion.

8. The seating support according to claim 7, wherein the first portion of the body front wall further comprises a foot section that is recessed from the standing surface.

9. A seating support for an industrial truck with a standing platform that is bordered on one side by a platform rear wall, the seating support comprising:
 a first section comprising a support body, wherein the support body comprises,
  a body rear wall configured to connect to the platform rear wall using one or more coupling elements, and
  a standing surface configured to contact the standing platform; and
 a second section comprising a support surface that is configured for an operator to sit on, wherein a surface opposite the standing surface of the first section abuts a surface of the second section,
 wherein the one or more coupling elements are a releasable hook-and-loop connection configured to be fastened to the platform rear wall and to the body rear wall.

10. The seating support according to claim 1, further comprising a height adjustment for the support surface.

11. A set of seating supports for an industrial truck with a standing platform that is bordered on one side by a platform rear wall, the set of seating supports each comprising:
 a first section comprising a support body, the support body further comprising,
  a body rear wall configured to releasably connect to the platform rear wall using one or more coupling elements, and
  a standing surface configured to contact the standing platform; and
a second section comprising a support surface that is configured for an operator to sit on, wherein a surface opposite the standing surface abuts a surface of the first section, and wherein each support surface varies in height with respect to the standing platform.

12. The seating support according to claim 1, wherein the connection of the body rear wall to the platform rear wall using one or more coupling elements does not require tools.

13. The set of seating supports according to claim 11, wherein the releasable connection of the body rear wall to the platform rear wall using one or more coupling elements does not require tools.

* * * * *